United States Patent [19]
Izuno et al.

[11] Patent Number: 5,717,852
[45] Date of Patent: Feb. 10, 1998

[54] MULTIPLE BUS CONTROL METHOD AND A SYSTEM THEREOF

[75] Inventors: Nobuaki Izuno, Fukuoka; Yasuo Kurosu, Yokosuka, both of Japan

[73] Assignee: Hitachi, Ltd., Tokyo, Japan

[21] Appl. No.: 661,800

[22] Filed: Jun. 13, 1996

Related U.S. Application Data

[63] Continuation of Ser. No. 206,924, Mar. 7, 1994, abandoned.

[30] Foreign Application Priority Data

Mar. 10, 1993 [JP] Japan .................. 5-049412

[51] Int. Cl.$^6$ ........................................ G06F 11/00
[52] U.S. Cl. .................. 395/185.09; 395/181; 395/308
[58] Field of Search ............... 395/185.09, 183.19, 395/200.17, 290, 306, 307, 308, 182.02, 181

[56] References Cited

U.S. PATENT DOCUMENTS

| | | | |
|---|---|---|---|
| 4,438,494 | 3/1984 | Budde et al. | 371/11.3 |
| 4,456,965 | 6/1984 | Graber et al. | 364/900 |
| 4,503,535 | 3/1985 | Budde et al. | 371/11.3 |
| 4,672,537 | 6/1987 | Katzman et al. | 395/185.09 |
| 4,750,177 | 6/1988 | Hendrie et al. | 371/32 |
| 4,866,604 | 9/1989 | Reid | 364/200 |
| 5,247,522 | 9/1993 | Reiff | 371/29.5 |
| 5,257,269 | 10/1993 | Hamauchi | 371/29.5 |
| 5,303,353 | 4/1994 | Matsuura et al. | 395/307 |
| 5,345,566 | 9/1994 | Tanji et al. | 395/183.19 |
| 5,404,465 | 4/1995 | Novakovich et al. | 371/20.1 |

*Primary Examiner*—Robert W. Beausoliel, Jr.
*Assistant Examiner*—Joseph E. Palys
*Attorney, Agent, or Firm*—Antonelli, Terry, Stout, & Kraus, LLP

[57] ABSTRACT

In the bus constitution in an information processing unit for transferring data between a bus-master and bus-slave via a plurality of buses, if a fault occurs in a bus when data is transferred between the bus-master and bus-slave via the buses and the H side fault detection/reporting circuit of the bus-slave or the H side fault detection/processing circuit of the bus-master detects the fault, the data transfer via the bus is stopped and information indicating that the bus is faulty is stored in the bus status information keeping circuit. When the data transfer via the bus ends normally thereafter, the bus selector confirms that the bus is normal from the information of the bus status information keeping circuit and activates the L side bus controller so as to operate the bus and to transfer the data which cannot be transferred due to the bus fault via the bus.

9 Claims, 3 Drawing Sheets

MULTIPLE BUS CONTROL METHOD AND A SYSTEM THEREOF

This application is a continuation application of Ser. No. 08/206,924, filed Mar. 7, 1994, now abandoned.

BACKGROUND OF THE INVENTION

1. Field of the Invention

The present invention relates to a multiple bus control method for transferring data efficiently by a plurality of data buses and a system using the method.

2. Description of the Prior Art

A conventional information system such as an information processing unit, work station, personal computer, or peripheral device generally uses buses extensively so as to transfer the internal information thereof, and a method for driving a plurality of buses which are provided in the system simultaneously so as to improve the data transfer performance is known. However, to improve the data transfer performance, it is necessary not only to provide a plurality of buses but also to effectively occupy and control the plurality of buses. An example is indicated, for example, in Japanese Patent Application Laid-Open No. 3-81855. It will be explained hereunder with reference to FIG. 3 of this disclosure.

In the drawing, two data transfer circuits 30A and 30B are connected via three data buses DB1, DB2, and DB3 and data bus busy signal lines BL1, BL2, and BL3, to which busy signals indicating whether or not the data buses DB1, DB2, and DB3 are in use are supplied, are installed in the data buses respectively. In the data transfer circuits 30A and 30B, data bus connection circuits 32A and 32B are installed for connecting internal buses which are not shown to one of the data buses DB1, DB2, and DB3 and preferential order decision circuits 31A and 31B.

These preferential order decision circuits 31A and 31B determine which one of the data buses DB1, DB2, and DB3 is in use and which ones are not in use by busy signals from the data bus busy signal lines BL1, BL2, and BL3, set the predetermined-order of priority for the data buses DB1, DB2, and DB3, select and determine a data bus to be used from the unused data buses among the data buses DB1, DB2, and DB3 when transferring data, and supply a data bus selection signal indicating the determined data bus to the data bus connection circuits 32A and 32B.

Assuming that the preferential order decision circuits 31A and 31B set the preferential order as the order of the data buses DB1, DB2, and DB3 and the data bus DB1 is already in use when an attempt is made to transfer data between the data transfer circuits 30A and 30B, the preferential order decision circuits 31A and 31B send a data bus selection signal for designating use of the data bus DB2 which is assigned the second highest priority to the data bus connection circuits 32A and 32B. By doing this, data is transferred between the data transfer circuits 30A and 30B using the data bus DB2.

One of the unused data buses is used like this and a plurality of buses can be used effectively.

However, the above conventional prior art has the following problems.

Firstly, the data bus connection circuits 32A and 32B in the bus-master (data transfer circuits 30A and 30B) are common to a plurality of data buses DB1, DB2, and DB3 and when one of the circuits fails, the bus-master cannot transfer data.

Secondly, when one of the data bus busy signal lines BL1, BL2, and BL3 fails and the busy signal of the failed data bus busy signal line is a false signal, even if a data master is using the data bus corresponding to the failed data bus busy signal line, it is not transmitted to the other bus-master and it is indicated that no busy signal is used. As a result, the other bus-master also uses this data bus and data cannot be transferred correctly.

As mentioned above, according to the above prior art, no consideration is given to a method and means for avoiding a fault when it occurs and there is a problem imposed in fault tolerance.

SUMMARY OF THE INVENTION

An object of the present invention is to eliminate the difficulties of the prior art mentioned above and to provide a multiple bus control method for speeding up data transfer and improving fault tolerance and a system using the method.

To accomplish the above object, the multiple bus control method and system of the present invention are in a system wherein data transfer means connected by a plurality of buses occupies at least one bus when transferring data, transfers data and detects whether there is a fault in the operation of a bus by at least one data transfer means connected to the bus for each bus for transferring data. The system furthers stops the data transfer of the bus when a fault is detected in the operation of the bus, and retransfers the data which is stopped in transfer via a fault-free bus.

More specifically according to embodiments which will be described later, the present invention is a multiple bus control method in a system for transferring data between the bus-master and bus-slave by occupying a plurality of buses, which detects whether there is a fault in each bus for transferring data, stops the data transfer by the failed bus, and retransfers the data via a fault-free bus.

The system of the present invention is a system for transferring data between the bus-master and bus-slave by occupying a plurality of buses. The bus-slave includes bus control means for controlling access from the bus-master for each bus and fault detection/reporting means for detecting whether there is a fault in each bus when transferring data and for reporting the detection result to the bus-master. The bus-master includes fault detection/processing means for detecting whether there is a fault in each bus when transferring data and for generating information indicating whether or not the buses can be used according to the detection result and the report from the fault detection/reporting means of the bus-slave, information keeping means for keeping the information generated by the fault detection/processing means, bus selection means for confirming whether or not the buses can be used according to the information kept by the information keeping means when transferring data, and bus control means for driving the usable bus according to the confirmation of the bus selection means when data transfer starts and for stopping the data transfer by the unusable bus which is confirmed by the bus selection means after the data transfer starts. The bus selection means selects and drives the usable bus by starting the bus control means after data transfer and retransfers the data, which is transferred halfway via the unusable bus, via the bus which is selected and driven.

The present invention having the aforementioned constitution has the following function and operation.

According to the multiple bus control method of the present invention, a plurality of buses are occupied between the bus-master and bus-slave when transferring data and whether or not there is a fault in the buses is detected. When one of the buses fails, the data transfer by the failed bus is stopped and the data is retransferred via a normal bus which is also transferring data when the data transfer ends. By doing this, data is transferred via a plurality of buses, and the data transfer is speeded up, and even if any bus fails, the data transfer will not be stopped, and the fault tolerance is improved.

According to the multiple bus control method of the present invention, when the bus selection means of the bus-master confirms the usable bus from the information of the information keeping means, the bus selection means starts the bus control means of the bus-master and bus-slave and puts the usable bus into the operation state. In this state, data is transferred between the bus-master and bus-slave via all the usable buses. By doing this, data can be transferred at high speed.

When one of the buses fails during the data transfer, in the case of data transfer from the bus-master to the bus-slave, the fault is detected by the fault detection/reporting means of the bus-slave and reported to the fault detection/processing means of the bus-master. In the case of data transfer from the bus-slave to the bus-master, the fault is detected by the fault detection/processing means of the bus-master and the fault detection/processing means updates the information of the information keeping means according to the fault. The bus selection means confirms the failed bus from this updating of the information of the information keeping means and stops the data transfer by the bus. When the current data transfer ends, the bus selection means confirms the usable bus from the information of the information keeping means and retransfers the data which is stopped in transfer via this bus.

By doing this, even if a fault occurs in one of the buses, the data transfer is not stopped, and all the data can be transferred, and the fault tolerance is improved.

The foregoing and other objects, advantages, manner of operation and novel features of the present invention will be understood from the following detailed description when read in connection with the accompanying drawings.

DETAILED DESCRIPTION OF THE PREFERRED EMBODIMENT

The embodiment of the present invention will be explained hereunder with reference to the accompanying drawings.

Figure 1:
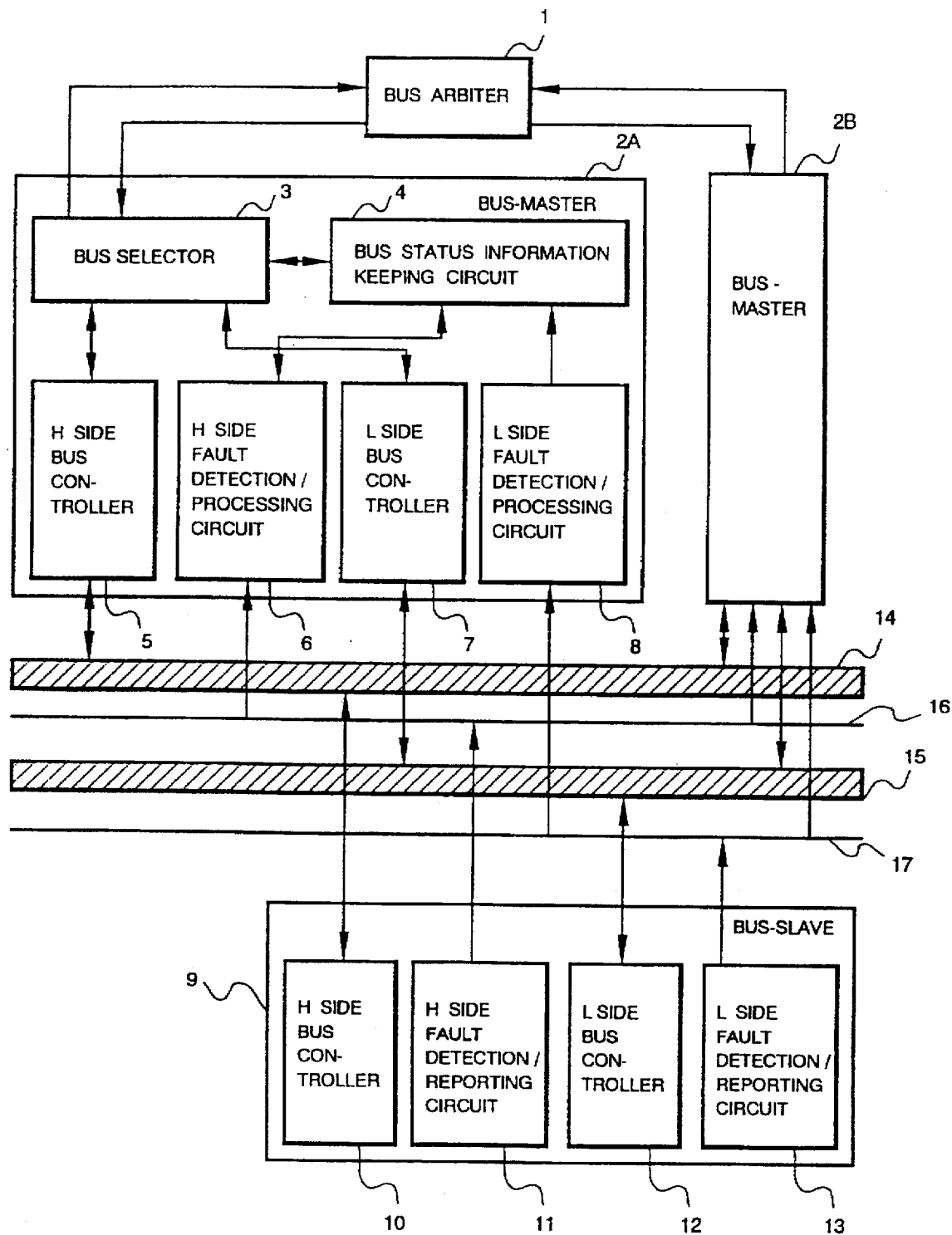
FIG. 1 is a block diagram showing an embodiment of the multiple bus control method and system using the method of the present invention.

FIG. 1 is a block diagram showing an embodiment of the multiple bus control method and system using the method of the present invention which has a double bus configuration. A reference numeral 1 indicates a bus arbiter, 2A and 2B bus-masters, 3 a bus selector, 4 a bus status information keeping circuit, 5 an H side bus controller, 6 an H side fault detection/processing circuit, 7 an L side bus controller, 8 an L side fault detection/processing circuit, 9 a bus-slave, 10 an H side bus controller, 11 an H side fault detection/reporting circuit, 12 an L side bus controller, 13 an L side fault detection/reporting circuit, 14 an H side bus, 15 an L side bus, 16 a reporting line of H side transmitted result, and 17 a reporting line of L side transmitted result.

In the drawing, the bus-masters 2A and 2B and the bus-slave 9 are connected by two data buses, that is, the H side bus 14 and the L side bus 15. The H side bus 14 is accompanied by the reporting line of H side transmitted result 16 and the L side bus 15 is accompanied by the reporting line of L side transmitted result 17.

The bus-master 2A consists of the bus selector 3, the bus status information keeping circuit 4, the H side bus controller 5, the H side fault detection/processing circuit 6, the L side bus controller 7, and the L side fault detection/processing circuit 8. The bus-master 2B has the same constitution. The bus arbiter 1 arbitrates the bus occupation rights of the bus-masters 2A and 2B and gives the occupation right of the buses 14 and 15 to the higher-priority bus-master. The bus-slave 9 consists of the H side bus controller 10, the H side fault detection/reporting circuit 11, the L side bus controller 12, and the L side fault detection/reporting circuit 13.

In the bus-master 2A, the bus status information keeping circuit 4 keeps the bus status information indicating where there is a fault in the H side bus 14 and the L side bus 15 and the bus selector 3 confirms whether there is a fault in the H side bus 14 and the L side bus 15 from the bus status information kept by the bus status information keeping circuit 4 when the bus occupation right is given to the bus-master 2A by the bus arbiter 1 and selects the fault-free bus. When neither the H side bus 14 nor the L side bus 15 have faults, the bus selector 3 selects the both. When the two are faulty, the bus selector 3 does not either of the two.

When the bus selector 3 selects the H side bus 14 as mentioned above, the H side bus controller 5 is started by the bus selector 3 and drives the H side bus 14. By doing this, an internal bus of the bus-master 2A, which is not shown in the drawing, is connected to the H side bus 14. In the same way, when the bus selector 3 selects the L side bus 15, the L side bus controller 7 is started by the bus selector 3 and drives the L side bus 15. By doing this, an internal bus of the bus-master 2A which is not shown in the drawing is connected to the L side bus 15.

When data is transferred from the bus-master 2A to the bus-slave 9 via the H side bus 14, any fault in the H side bus 14 is always detected by the H side fault detection/reporting circuit 11 of the bus-slave 9, and the detection result is sent to the H side fault detection processing circuit 6 of the bus-master 2A via the reporting line of H side transmitted result 16. The H side fault detection/processing circuit 6 sends the detection result to the bus status information keeping circuit 4 as bus status information for the H side bus 14. In the same way, the L side fault detection/processing circuit 8 also sends the detection result to the bus status information keeping circuit 4 as bus status information for the L side bus 15 from the L side fault detection/reporting circuit 13 of the bus-slave 9.

When data is transferred from the bus-slave 9 to the bus-master 2A via the H side bus 14 and the L side bus 15, the H side fault detection/processing circuit 6 and the L side fault detection/processing circuit 8 detect where there is a fault in the H side bus 14 and the L side bus 15 respectively and send the detection results to the bus status information keeping circuit 4 as bus status information.

Bus status information indicating whether there is a fault in the H side bus 14 and the L side bus 15 is always kept by the bus status information keeping circuit 4 like this and when the status of the H side bus 14 or the L side bus 15 is changed, the bus status information is updated.

When data is transferred from the bus-master 2A to the bus-slave 9, the address for designating the bus-slave 9, receiving command, and data are sent from the bus-master 2A to the bus-slave 9. In the bus-slave 9, the H side bus controller 10 is started by the address and command which are sent via the H side bus 14 and an internal bus which is not shown in the drawing is connected to the H side bus 14 so that data which is sent via the H side bus 14 can be received. The L side bus controller 12 is started by the address and command which are sent via the L side bus 15 and an internal bus, which is not shown in the drawing, is connected to the L side bus 15 so that data which is sent via the L side bus 15 can be received.

When data is transferred from the bus-slave 9 to the bus-master 2A, the address for designating the bus-slave 9 and transmission command are sent from the bus-master 2A to the bus-slave 9. In the bus-slave 9, the H side bus controller 10 is started by the address and command which are sent via the H side bus 14, and an internal bus, which is not shown in the drawing, is connected to the H side bus 14 so that data can be sent to the bus-master 2A via the H side bus 14. The L side bus controller 12 is started by the address and command which are sent via the L side bus 15 and an internal bus, which is not shown in the drawing, is connected to the L side bus 15 so that data can be sent to the bus-master 2A via the L side bus 15.

The same may be said with data transfer between the bus-master 2B and the bus-slave 9.

Figure 2:
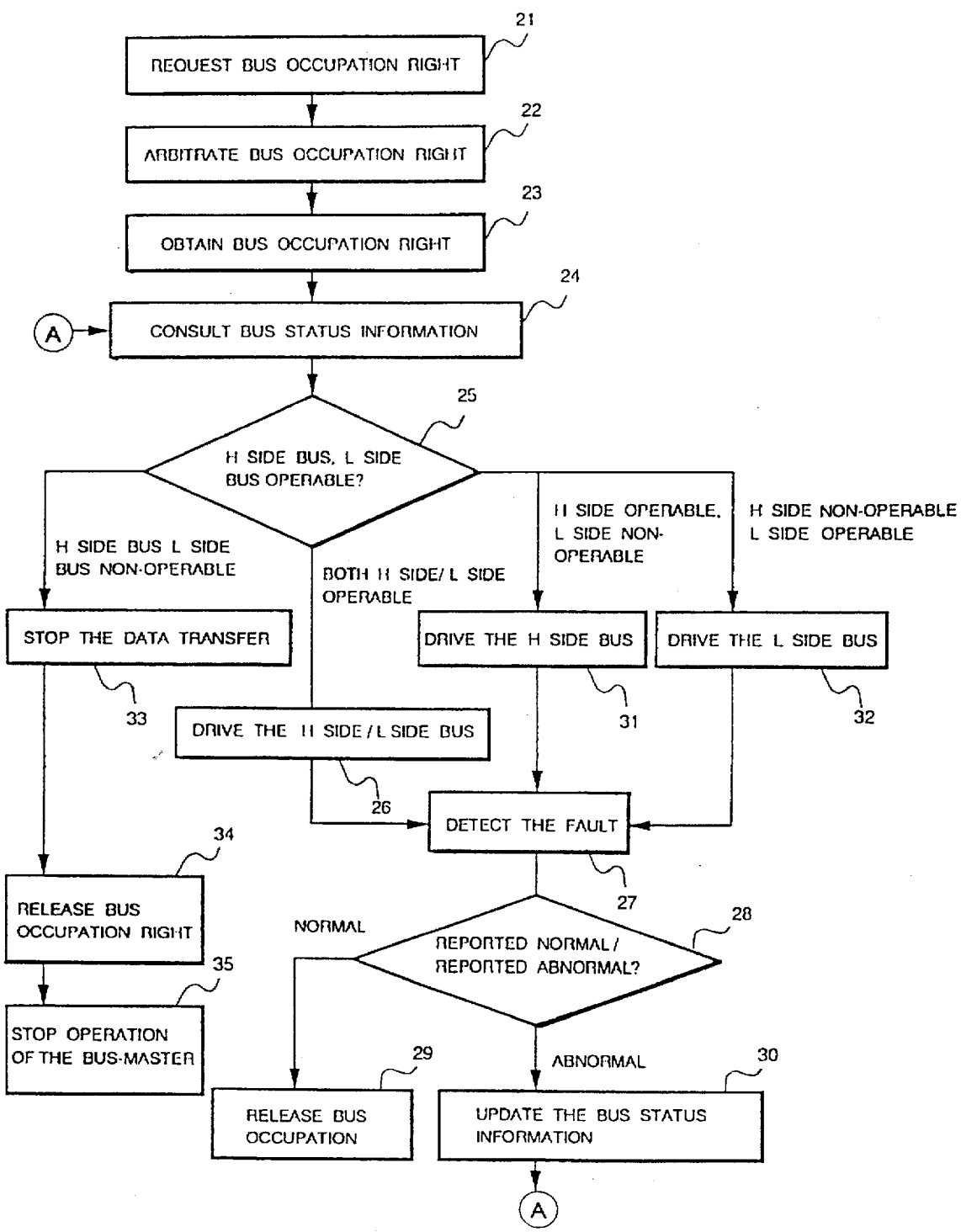
FIG. 2 is a flow chart showing the operation of the embodiment shown in FIG. 1.
Figure 3:
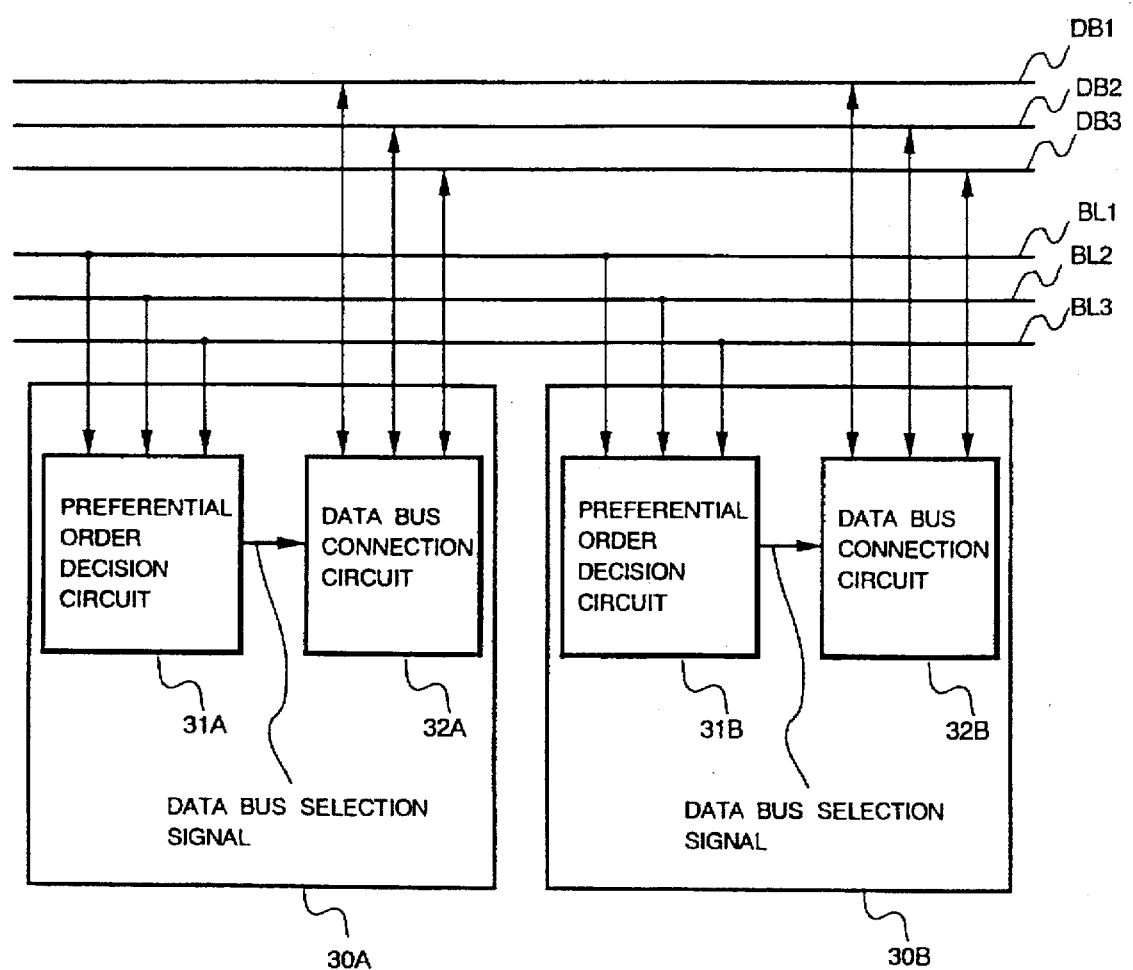
FIG. 3 is a flow chart showing an example of the conventional multiple bus control method.

Next, the operation of this embodiment will be explained with reference to FIG. 2. In the embodiment, it is assumed that a disk array apparatus is used and data is written or read into or from a disk by the bus-slave 9. At least one same disk apparatus is connected to the H side bus controller 10 and the L side bus controller 12.

Firstly, it is assumed that the H side bus 14 and the L side bus 15 are not faulty.

The bus-master 2A using two buses of the H side bus 14 and the L side bus 15 requests a bus occupation right to the bus arbiter 1 (Step 21). Assuming that the bus-masters 2A and 2B request bus occupation rights, the bus arbiter 1 arbitrates the bus occupation rights (Step 22) and gives the occupation right of the H side bus 14 and the L side bus 15 to the higher-priority bus-master (the bus-master 2A in this case). When the bus-master 2A obtains the bus occupation right, the bus selector 3 thereof refers to the bus status information of the bus status information keeping circuit 4 (Step 24) and confirms whether there is a fault in the H side bus 14 and the L side bus 15 (Step 25).

Since there is no fault in the H side bus 14 and the L side bus 15 in this case, the bus selector 3 selects both the H side bus 14 and the L side bus 15 and activates the H side bus controller 5 and the L side bus controller 7 to drive both buses. By doing this, the H side bus 14 is driven by the H side bus controller 5, the L side bus 15 is driven by the L side bus controller 7 (Step 26) and the buses access the bus-slave 9 simultaneously. The bus selector 3 also monitors the bus status information of the bus status information keeping circuit 4.

When data is to be written on a disk, the disk address for writing the data, write command, and data to be written are transferred from the bus-master 2A as mentioned above, the access from the H side bus 14 is received by the H side bus controller 10 of the bus-slave 9, the access from the L side bus 15 is received by the L side bus controller 12, and the data is input respectively. Simultaneously with this data input, the H side fault detection/reporting circuit 11 and the L side fault detection/reporting circuit 13 detect whether there is a fault in the H side bus 14 and the L side bus 15 respectively (Step 27). When no fault is detected in the buses after the data input ends, reports of "Normal" indicating the two detection results are sent to the H side fault detection/processing circuit 6 and the L side fault detection/processing circuit 8 of the bus-master 2A via the reporting line of H side transmitted result 16 and the reporting line of L side transmitted result 17 (Step 28). In this case, the bus status information kept by the bus status information keeping circuit 4 is not updated. Thereafter, the bus-master 2A releases the bus occupation right (Step 29) and the data transfer is completed. The bus selector 3 stops the monitoring of the bus status information of the bus status information keeping circuit 4.

When data is to be read from a disk, the disk address to be read and the read command are transferred from the bus-master 2A, the access from the H side bus 14 is received by the H side bus controller 10 of the bus-slave 9, the access from the L side bus 15 is received by the L side bus controller 12, the data is read respectively and the data is transferred via the H side bus 14 and the L side bus 15. In the bus-master 2A, the H side bus controller 5 and the L side bus controller 7 accepts read data and simultaneously the H side fault detection/processing circuit 6 and the L side fault detection/processing circuit 8 detect whether there is a fault in the H side bus 14 and the L side bus 15 (Step 27). When no fault is detected in the accepted data, the bus-master 2A releases the bus occupation right (Step 29) and the data transfer is completed. Also in this case, the bus status information kept by the bus status information keeping circuit 4 will not be updated. The bus selector 3 stops the monitoring of the bus status information of the bus status information keeping circuit 4.

Next, the operation when the H side bus 14 fails while writing data on a disk will be explained.

As mentioned above, the bus-master 2A obtains the bus occupation right (Step 23) and the bus selector 3 refers to the bus status information of the bus status information keeping circuit 4 (Step 24). In this case, it is assumed that the bus status information indicates that neither the H side bus 14 nor the L side bus 15 are faulty. Therefore, the two buses are operable (Step 25) and the bus selector 3 starts the H side bus controller 5 and the L side bus controller 7 and transfers data to the bus-slave 9 using the H side bus 14 and the L side bus 15 (Step 26). The bus selector 3 continues the monitoring of the bus status information of the bus status information keeping circuit 4.

When a fault occurs in the H side bus 14 during this data transfer thereafter, the H side fault detection/reporting circuit 11 of the bus-slave 9 detects the fault (Step 27) and the H side bus controller 10 stops the data input. The H side fault detection/reporting circuit 11 reports "Fault" to the H side fault detection/processing circuit 6 of the bus-master 2A via the reporting line of H side transmitted result 16 (Step 28). By doing this, the H side fault detection/processing circuit 6 updates the bus status information of the bus status information keeping circuit 4 to information indicating that the H side bus 14 is faulty (Step 30) and the H side bus controller 5 stops the data transfer to the bus-slave 9 when the bus selector 3 confirms it. Therefore, data transfer of the H side bus 14 will not be realized.

On the other hand, since no fault is detected in the L side bus 15, the L side bus controller 12 of the bus-slave 9 operates so as to continue the data input. When the data input ends, the L side fault detection/reporting circuit 13 reports "Normal" to the L side fault detection/processing circuit 8 of the bus-master 2A via the reporting line of L side transmitted result 17. When the L side fault detection/processing circuit 8 receives the "Normal" report, the bus selector 3 refers to the bus status information of the bus status information keeping circuit 4 (Step 24), confirms that the H side bus 14 is not operable but the L side bus 15 is operable (Step 25), and starts only the L side bus controller 7. The L side bus controller 7 transfers the above data which cannot be transferred due to an occurrence of fault in the H side bus 14 to the bus-slave 9 via the L side bus 15 (Step 32).

Since the H side bus 14 of the bus-slave 9 is stopped and the L side bus 15 is in operation, only the L side bus controller 12 and the L side fault detection/reporting circuit 13 operate and they input data and detect whether there is a fault in the L side bus 15 (Step 27). When no fault occurs in the L side bus 15, "Normal" is reported to the bus-master 2A from the L side fault detection/reporting circuit 13 of the bus-slave 9 via the reporting line of L side transmitted result 17 when the data input ends (Step 28), and the bus-master 2A receives the "Normal" report and releases the bus occupation right (Step 29), and the data writing is completed. The bus selector 3 terminates the monitoring of the bus status information of the bus status information keeping circuit 4.

Next, the operation when the H side bus 14 fails while reading data from a disk will be explained.

In the same way as with the above case, the bus-master 2A obtains the bus occupation right (Step 23) and the bus selector 3 refers to the bus status information of the bus status information keeping circuit 4 (Step 24). When it is confirmed that no fault occurs in the H side bus 14 and the L side bus 15 (Step 25), the bus selector 3 considers that the buses 14 and 15 are operable, starts the H side bus controller 5 and the L side bus controller 7, and transfers the disk address and read command to the bus-slave 9 via the H side bus 14 and the L side bus 15 (Step 26). The bus selector 3 monitors the bus status information of the bus status information keeping circuit 4.

The read data is transferred from the bus-slave 9 and simultaneously the H side fault detection/processing circuit 6 and the L side fault detection/processing circuit 8 of the bus-master 2A detect whether there is a fault in the H side bus 14 and the L side bus 15 (Step 27). When a fault occurs in the H side bus 14 during transfer of the read data, the fault is detected by the H side fault detection/processing circuit 6 of the bus-master 2A and the bus status information of the bus status information keeping circuit 4 for the H side bus 14 is updated to information of "inoperable" (Step 30). The bus selector 3 confirms this updating, stops the H side bus controller 5, and stops the acceptance of the read data. Since the L side bus 15 is not faulty, the L side bus controller 7 operates so as to continue the acceptance of data from the L side bus 15.

When the transfer of the read data via the L side bus 15 ends and it is detected by the L side fault detection processing circuit 8 that the L side bus 15 is normal, the bus selector 3 refers to the bus status information of the bus status information keeping circuit 4 (Step 24), confirms that the H side bus 14 is inoperable and the L side bus 15 is operable (Step 25), and starts only the L side controller 7. By doing this, the L side bus controller 7 sends the disk address and read command to the bus-slave 9 via the L side bus 15 and transfers the above read data which cannot be transferred due to the fault in the H side bus 14 to the L side bus controller 7 of the bus-master 2A via the L side bus 15 (Step 32). Since the L side bus 15 is not faulty in this case, no fault is detected by the L side fault detection/processing circuit 8 even when the transfer of read data ends (Step 27) and as a result, the bus selector 3 releases the bus occupation right (Step 29) and the data transfer is completed. The bus selector 3 terminates the monitoring of the bus status information of the bus status information keeping circuit 4.

As mentioned above, according to this embodiment, since data is transferred at the same time via all buses which are not faulty, data can be transferred at high speed, and, even if one of the buses fails during data transfer, the data transfer is continued by the other bus and the data which cannot be transferred is retransferred by the bus which is not faulty. Therefore, data can be transferred without being affected by a bus fault and the fault tolerance of the system is improved remarkably.

Even if the H side bus controller 5 or the L side bus controller 7 of the bus-master 2A or 2B fails or the H side bus controller 10 or the L side bus controller 12 of the bus-slave 9 fails, the H side fault detection/processing circuit 6 or the L side fault detection/processing circuit 8, or the H side fault detection/reporting circuit 11 or the L side fault detection/reporting circuit 13 detects the fault in the same way as with a case that the H side bus 14 or the L side bus 15 fails, and data is not transferred incorrectly, and since all the buses are occupied by the bus-master and bus-slave which transfer data, no data is transferred between another bus-master and bus-slave and no different data is transferred at the same time.

When the data is to be re-sent due to the aforementioned bus fault, the bus-master 2A obtains the bus occupation right (Step 23) and then the bus selector 3 refers to the bus status information (Step 24). Therefore, the H side bus 14 which is faulty is not used and the data is transferred by the L side bus 15, so that the fault of the H side bus 14 will not be detected again.

When a fault occurs in the L side bus 15 in the above description, the data which cannot be transferred due to the fault is transferred via the H side bus 14 (Step 31). When both the H side bus 14 and the L side bus 15 are faulty (Step 25), the data transfer is stopped (Step 33) and the bus-master 2A releases the bus occupation right (Step 34) and stops the operation (Step 35).

Furthermore, a fault of the H side bus 14 or the L side bus 15 can be detected from an error correction code generated from data, a mismatch of parity, a mismatch of transfer protocol, exceeding of the response time limit of read data, or exceeding of the time limit of normal/fault report.

Furthermore, the H side bus controller 5 and the H side fault detection/processing circuit 6, the L side bus controller 7 and the L side fault detection/processing circuit 8, the H side bus controller 10 and the H side fault detection/ reporting circuit 11, and the L side bus controller 12 and the L side fault detection/reporting circuit 13 are paired with each other respectively. These pairs may be set as a module respectively and the bus-masters 2A and 2B and the bus-slave 9 may be provided with a plurality of modules so as to miniaturize them and to allow easy assembly and replacement of parts.

Furthermore, although the aforementioned embodiment uses a double-bus constitution, a three-or-more-bus constitution may be easily realized by using a plurality of constitutions mentioned above. Furthermore, in a fault tolerant system having a predetermined number of components such as not only a disk array apparatus but also, for example, a CPU, memory unit, communication unit, or external memory unit respectively, the embodiment may be applied to data transfer between these components, that is, needless to say, it may be applied to other systems.

As explained above, according to the present invention, even if a fault occurs in a bus, only the faulty bus is stopped, and the data which cannot be transferred due to the fault is retransferred by another normal bus, and the data transfer can be continued even after the fault occurrence, so that an efficient multiple bus having high fault tolerance can be realized.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A multiple bus control method in a system wherein data transfer means connected by a plurality of buses occupies at least one bus when transferring data including words, said method comprising the steps of:

dividing each of said words into a plurality of component data;

simultaneously transferring said plurality of component data, as at least two partial sets of the component data, each of said partial sets of component data being transferred through a different one of said plurality of buses;

detecting whether there is a fault in the operation of each of said buses by said data transfer means connected to each of said plurality of buses;

stopping the partial sets of component data transfer of any of said buses when a fault is detected in the operation of said any of said buses; and retransferring the partial sets of component data stopped in transfer, via another of said buses, when determined as being fault-free, said another of said buses also transferring another partial set of component data.

2. A multiple bus control method according to claim 1, wherein said plurality of buses are two buses and when a fault is detected in one of the buses during the data transfer, said partial set of component data stopped in transfer is retransferred via said another bus determined to be fault-free after the data transfer of said another bus ends.

3. A multiple bus control method according to claim 1, wherein said system comprises a plurality of said data transfer means, each of said transfer means includes at least a CPU, memory means, and communication means as components and each of said data transfer means transfers data between said components.

4. A multiple bus control system comprising:
a bus-master;
a bus-slave;
a plurality of buses for simultaneously transferring data including words between said bus-master and said bus-slave; and
means for dividing each of said words into a plurality of component data, as at least two partial sets of the component data, each of said partial sets of component data being transferred through a different one of said plurality of buses, wherein said bus-slave includes:
bus control means for controlling access from said bus-master for each bus, and
fault detection/reporting means for detecting whether there is a fault in each bus when transferring data and for reporting the detection result to said bus-master;

said bus-master includes:
fault detection/processing means for detecting whether there is a fault in each bus when transferring data and for generating information indicating whether or not each bus can be used according to the detection result and the report from said fault detection/reporting means of said bus-slave,
information keeping means for keeping said information generated by said fault detection/processing means,
bus selection means for confirming whether or not each bus can be used according to said information kept by said information keeping means when transferring data, and
bus control means for driving a usable bus according to the confirmation of said bus selection means for transferring data between said bus-master and said bus-slave, and for stopping the partial set of component data transfer through a bus when it is confirmed to be unusable by said bus selection means; and said bus selection means further includes means for selecting and driving a usable bus by starting said bus control means after transferring its partial set of component data and retransferring the partial set of component data which is stopped in transfer via the unusable bus.

5. A multiple bus control system according to claim 4, wherein said plurality of buses are two buses and when a fault is detected in one of the buses during the data transfer, said data stopped in transfer is retransferred via the other bus after the data transfer of the other bus ends.

6. A multiple bus control system comprising:
a plurality of buses;
data transfer means connected by said plurality of buses, said data transfer means occupying at least one bus when transferring data including words;
means for dividing said words into a plurality of component data;
means for simultaneously transferring said plurality of component data, as at least two partial sets of the component data, each of said partial sets of component data being transferred through a different one of said plurality of buses;
means for detecting whether there is a fault in the operation of each of said buses by said data transfer means connected to said plurality of buses;
means for stopping the partial set of component data transfer of each of said plurality of buses when a fault is detected in the respective one of each of said buses; and
means for retransferring the partial set of component data stopped in transfer via another of said plurality of buses, when determined as being fault-free, said another of said buses also transferring another partial set of component data.

7. A multiple bus control system according to claim 6, wherein said plurality of buses include two buses, and when a fault is detected in one of said plurality of buses during the data transfer, said partial set of component data stopped in transfer is retransferred via said another bus determined as being fault-free after the data transfer of said another bus ends.

8. A multiple bus control system according to claim 6, wherein said system includes a plurality of said data transfer means having at least a CPU, memory means and communication means as components, and each of said data transfer means transfer data between each of said components.

9. A multiple bus control system comprising:

a bus-master;

a bus-slave;

a plurality of buses for simultaneously transferring data including words between said bus-master and said bus-slave; and means for dividing each of said words into a plurality of component data, as at least two partial sets of the component data, each of the partial sets of component data being transferred through a different one of said plurality of buses, wherein said bus-slave includes:
  bus control means for controlling access from said bus-master for each bus, and
  fault detection/reporting means for detecting whether there is a fault in each bus when transferring data and for reporting the detection result to said bus-master;

said bus-master includes:
  fault detection/processing means for detecting whether there is a fault in each bus when transferring data and for generating information indicating whether or not each bus can be used according to the detection result and the report from said fault detection/reporting means of said bus-slave,
  information keeping means for keeping said information generated by said fault detection/processing means,
  bus selection means for confirming whether or not each bus can be used according to said information kept by said information keeping means when transferring data, and
  bus control means for driving a usable bus according to the confirmation of said bus selection means for transferring data between said bus-master and said bus-slave, and for stopping the partial set of component data transfer through a bus when it is confirmed to be unusable by said bus selection means, wherein
    said bus selection means includes means for selecting and driving a usable bus by starting said bus control means after transferring its partial set of component data and retransferring the partial set of component data which is stopped in transfer via the unusable bus, and
    wherein further said bus control means and said fault detection processing means of said bus-master are provided in each of said buses, and said bus control means and said fault detection processing means of the same bus constitute a first module, and said bus control means and said fault detection/reporting means of said bus-slave are also provided in each of said buses, said bus control means and said fault detection/reporting means of the same bus constitute a second module, and both of said first and second modules further include power supply means and an interface with the same bus.

* * * * *